(12) United States Patent
Mars et al.

(10) Patent No.: US 12,465,027 B2
(45) Date of Patent: Nov. 11, 2025

(54) METHOD AND APPARATUS FOR DELIVERING FLUID DROPLETS ONTO AN OPEN AND STATIONARY TRAY

(71) Applicant: Desvac, Saint-Barthelemy d'Anjou (FR)

(72) Inventors: Julie Mars, Saint-Barthelemy d'Anjou (FR); Béatrice Scherdel, Saint-Barthelemy d'Anjou (FR); Olivier Boisdon, Saint-Barthelemy d'Anjou (FR)

(73) Assignee: Desvac, Saint-Barthelemy d'Anjou (FR)

( * ) Notice: Subject to any disclaimer, the term of this patent is extended or adjusted under 35 U.S.C. 154(b) by 391 days.

(21) Appl. No.: 18/016,420

(22) PCT Filed: Jul. 16, 2021

(86) PCT No.: PCT/FR2021/051330
§ 371 (c)(1),
(2) Date: Jan. 16, 2023

(87) PCT Pub. No.: WO2022/013506
PCT Pub. Date: Jan. 20, 2022

(65) Prior Publication Data
US 2023/0270080 A1 Aug. 31, 2023

(30) Foreign Application Priority Data

Jul. 17, 2020 (FR) ...................................... 2007535

(51) Int. Cl.
*A01K 45/00* (2006.01)
*A61D 1/02* (2006.01)
(Continued)

(52) U.S. Cl.
CPC .............. *A01K 45/00* (2013.01); *A61D 1/025* (2013.01); *B05B 12/04* (2013.01); *B05B 12/122* (2013.01); *B05B 13/041* (2013.01); *A61D 7/00* (2013.01)

(58) Field of Classification Search
None
See application file for complete search history.

(56) References Cited

U.S. PATENT DOCUMENTS

| 4,316,464 A | * | 2/1982 | Peterson | A61D 1/025 |
| | | | | 604/290 |
| 2002/0104485 A1 | * | 8/2002 | Lewis | A01K 13/003 |
| | | | | 119/72.5 |

(Continued)

FOREIGN PATENT DOCUMENTS

| CA | 2427907 A1 | * | 7/2004 | |
| FR | 3009794 A1 | * | 2/2015 | ............... D06B 1/02 |

(Continued)

OTHER PUBLICATIONS

International Search Report for corresponding PCT Application No. PCT/FR2021/051330 mailed Nov. 18, 2021.

*Primary Examiner* — Troy Chambers
*Assistant Examiner* — Brook Victoria Schmid
(74) *Attorney, Agent, or Firm* — Wood, Phillips, Katz, Clark & Mortimer (57) ABSTRACT

The present invention relates to a method and apparatus for delivering droplets of fluids onto an open tray (15) containing poultry. According to the invention, the apparatus comprises a stationary working surface, a single arm (16) supporting a plurality of fluid dispensing nozzles, a drive unit for driving the translation of said arm (16), said plurality of dispensing nozzles being connected to at least one fluid supply circuit comprising a fluid reservoir and a pumping unit, a control unit configured to control the drive unit of the (Continued)

arm and to define at least one duration T of travel of the arm (16) above said working surface. The travel time T includes a period of gradual acceleration of said arm (16) outside an area of said working surface occupied by said tray and bringing said arm to a first end of said tray (15) along the first direction at a travel velocity V, a period of constant velocity V when the arm (16) moves above said tray (15), and a period of gradual deceleration of said arm (16) when the latter has passed a second end of the tray (15) along the first direction. The control unit is also configured to control each pumping unit and activate each pumping unit only when said arm is above said tray.

15 Claims, 4 Drawing Sheets

(51) Int. Cl.
*A61D 7/00* (2006.01)
*B05B 12/04* (2006.01)
*B05B 12/12* (2006.01)
*B05B 13/04* (2006.01)

(56) References Cited

U.S. PATENT DOCUMENTS

| | | | |
|---|---|---|---|
| 2004/0144873 A1* | 7/2004 | Johnston, Jr. | A61D 1/025 239/11 |
| 2017/0209250 A1* | 7/2017 | Palmer | A61D 7/00 |
| 2020/0170769 A1* | 6/2020 | Petri | A01K 13/003 |
| 2023/0021847 A1* | 1/2023 | Baranyay | A01K 5/0275 |

FOREIGN PATENT DOCUMENTS

| | | | | |
|---|---|---|---|---|
| WO | WO-2005094387 A2 | * | 10/2005 | A01K 45/007 |
| WO | WO-2006081316 A2 | * | 8/2006 | A61P 31/12 |
| WO | WO-2009118828 A1 | * | 10/2009 | B05B 13/0473 |
| WO | WO-2016106254 A1 | * | 6/2016 | A61D 7/00 |

* cited by examiner

METHOD AND APPARATUS FOR DELIVERING FLUID DROPLETS ONTO AN OPEN AND STATIONARY TRAY

TECHNICAL FIELD

The present invention relates to a method for uniformly delivering droplets of different fluids onto birds placed in an open, stationary tray.

It also relates to an apparatus for distributing droplets of different fluids onto a stationary tray for the implementation of this method.

PRIOR ART

In order to meet the ever-increasing demand for foodstuffs, animals from intensive farming systems have become increasingly important.

Good health of these animals, especially to guarantee adequate production, requires preventative measures and, in particular, vaccinations to immunize these animals against various diseases during the first days of their life.

For example, in poultry farming, vaccines are typically administered to chicks at one day of age or between one (1) and five (5) days of age.

In order to treat a large number of chicks simultaneously, it is a known practice to expose these chicks, arranged on trays, or in baskets, moving on conveyors, to fine droplets of water containing the vaccine to be administered, these droplets being obtained by spraying. The direct contact of these chicks with the droplet mist ensures their vaccination via the oculomotor-nasal route.

It is also known that these trays loaded with chicks are passed, by means of conveyors, under nozzles ejecting drops of gel containing a vaccine, these drops adhering to the surface being colored, for example, in a color attractive to the chick. Such coloring also makes it possible to ensure that the product has been properly taken up by a simple visual check of the front of the animal's mouth.

The drops of gel that fall on the body of each chick are then pecked by other chicks placed nearby so that each chick receives a sufficient amount of vaccine.

Fixed supports are used to support a set of nozzles to deliver droplets of a specific fluid to a dedicated treatment area, these supports being arranged to hang over the conveyors transporting the chick-loaded trays.

Thus, when chicks are intended to receive different treatments, the trays bearing these chicks are transported by means of conveyors to different treatment areas separated from each other.

Therefore, it is noted that facilities for mass vaccination of live animals, equipped with such conveyer systems, are comprehensive, and therefore require extensive space.

Such mass vaccination facilities for live animals are therefore not suitable for all types of operations, especially for small livestock farms.

There is therefore a pressing need for mass treatment equipment for live animals, the original design of which overcomes the above-mentioned drawbacks of the prior art.

OBJECT OF THE INVENTION

The present invention aims at overcoming the disadvantages of the prior art by proposing a method and an apparatus for mass treatment of live animals, which is simple in its design and in its operating method, reliable, fast and requires a reduced space for its implementation.

Another object of the present invention is such a method and such an apparatus for mass treatment of live animals guaranteeing homogeneous treatment of each live animal contained on an open tray or in a basket.

Yet another object of the present invention is such a method and apparatus that minimizes the loss of treatment fluids while ensuring a uniform and homogeneous distribution of these fluids on an open tray.

Yet another object of the present invention is such a method and apparatus for handling open trays of different sizes.

The present invention is also intended for use in the mass administration of two fluids selected from preventive or therapeutic substances such as vaccines, nutritional substances or combinations of these elements.

EXPLANATION OF THE INVENTION

To this end, the invention relates to an apparatus for delivering droplets of fluids onto an open tray containing poultry.

According to the invention, this apparatus comprises:

- a fixed work surface for receiving and supporting said tray,
- a single arm bearing a plurality of fluid dispensing nozzles
- a drive unit for translating said arm along a first direction of the tray when the latter is on said working surface, said arm moving above said tray,
- said plurality of dispensing nozzles being connected to at least one fluid supply circuit, each fluid supply circuit comprising a fluid reservoir for supplying corresponding dispensing nozzles with said fluid and a pumping unit for pumping the fluid from the reservoir to said corresponding dispensing nozzles, and
- a control unit configured to control the arm drive unit and define at least one travel time T of the arm over said working surface, said travel time T comprising:
  - a period of progressive acceleration of said arm away from an area of said working surface occupied by said tray and bringing said arm to a first end of said tray along said first direction with a travel velocity V,
  - a period of constant velocity V as said arm moves over said tray, and
  - a period of progressive deceleration of said arm when the latter has passed a second end of the tray along the first direction, and in that
- said control unit is also configured to control each pumping unit and activate each pumping unit only when said arm is over said tray.

Advantageously, it is observed that these progressive, i.e. regular and continuous, accelerations/decelerations avoid the occurrence of jerks in the movement of the arm, which would be likely to cause undesired loss of fluids from the tray.

This minimizes fluid losses, which can be very costly for the operator.

Moreover, this device is compact and can be used with success on small farms.

The tray has a rectangular or square section; the first direction is advantageously the length of this tray and the second direction is the width of this tray. Of course, variants are possible.

By "bird" we mean any avian species, such as birds of the Ayes class, i.e. vertebrate animals which are feathered, winged, bipedal, endothermic (warm-blooded) and able to lay eggs. In the context of the present invention, birds refers more particularly to birds of economic and/or agronomic interest, such as poultry (e.g., chickens, turkeys, hens, guinea fowl, quail, partridges and pigeons), migratory birds (e.g., ducks and geese) and ornamental birds (e.g., swans, parrots and Psittacidae).

Such an apparatus for distributing droplets of fluids finds applications in particular in the field of vaccination of chicks within a few days of their birth, i.e. between one (1) and five (5) days of age, preferably at one (1) day of age, i.e. 24 hours after hatching According to an embodiment of this apparatus for delivering droplets of fluids, it comprises at least one sensor for detecting the area occupied by said tray on said working surface, said at least one sensor sending tray positioning signals to said control unit. Preferably this apparatus comprises one or more object detection devices such as adjustable position stops or one or more optical devices for determining the dimensions of said tray.

It is thus possible for the control unit to determine the different time periods depending on the position on the work surface and/or the dimensions of the tray.

According to another embodiment of this apparatus for delivering fluid droplets, each pumping unit is an electric, pneumatic or hydraulic pump.

Preferably, it is a syringe pump whose piston is driven by an electric, pneumatic or hydraulic activator.

According to yet another embodiment of this apparatus for delivering droplets of fluids, it comprises at least two separate supply circuits each having a pumping unit, this control unit being a programmable unit for individually activating/deactivating said or some of said pumping units.

It is thus possible not only to manage the activation or not of each pumping unit according to the fluids to be delivered but it is also possible to define for each supply circuit the desired volume of fluid to be delivered.

Preferably, this programmable unit is a microcontroller.

According to yet another embodiment of this apparatus for delivering droplets of fluids, this drive unit comprises an electric motor which includes a gear wheel, this gear wheel meshing with a gear track of a guide rail extending along the first direction of the tray.

Alternatively this drive unit is a linear activator, the mobile arm being mounted perpendicularly, or substantially perpendicularly, to the free end of this activator. This linear activator can be an electric, pneumatic or hydraulic activator.

According to yet another embodiment of this apparatus for dispensing droplets of fluids, this arm carries a first set of dispensing nozzles for dispensing at least one first fluid and a second set of dispensing nozzles for dispensing at least one second fluid, distinct from the at least one first fluid, the dispensing nozzles of each set being arranged so that the entire dimension of the tray along a second direction perpendicular to the first direction is covered by these first and second sets of dispensing nozzles, when this tray is received on the said working surface.

Advantageously, this apparatus is configured to provide a time delay between the dispensing of at least one first fluid by means of said first set of dispensing nozzles and at least one second fluid by means of said second set of dispensing nozzles are spaced apart from each other on said arm along the first direction by a distance defining this time delay. Advantageously, this distance is calculated to guarantee an effective treatment of the poultry by the second fluid.

As an example, the spacing between the two (2) assemblies is between 4 and 10 cm, preferably between 4 and 7 cm, even more preferably the spacing is 5 cm.

In yet another embodiment of this apparatus for delivering droplets of fluids, the first set of nozzles comprises fluid spray nozzles and the second set of nozzles comprises fluid spray nozzles or needles for ejecting individual drops of a fluid.

While being advantageously compact, this apparatus can deliver in a very short time interval, even quasi-simultaneously, two distinct fluids such as a spray and a gel, to treat in mass poultry placed on a tray or in a basket.

The creation of a time lag between the distribution of the two fluids avoids the dilution of the gel drops by the mist of droplets of the first fluid.

The spray nozzles can have flat or conical heads. Preferably, they are flat to form a curtain of droplets.

Each of these nozzles is configured to eject an individual drop of fluid through its orifice at a given fluid pressure.

Such a device has applications in the veterinary field, especially for the mass vaccination of chicks.

The present invention also relates to a method for delivering droplets of fluids onto an open tray containing poultry, said tray being stationary.

According to the invention,
 a mobile arm is moved over said working surface, translating along a first direction of said tray, said arm carrying a plurality of fluid dispensing nozzles, said dispensing nozzles being arranged to cover the entire dimension of the tray in a second direction perpendicular to the first direction,
 said arm is moved for at least a time T of movement of the arm over said working surface, said time T of movement including:
  a period of progressive acceleration of said arm away from an area of said working surface occupied by said tray and bringing said arm to a first end of said tray along said first direction with a movement velocity V,
  a period of constant velocity V as said arm moves over said tray, and
  a period of gradual deceleration of said arm when said arm has passed a second end of said tray along said first direction,
 and
 said plurality of dispensing nozzles being connected to at least one fluid supply circuit, each fluid supply circuit comprising a fluid reservoir for supplying corresponding dispensing nozzles with said fluid and a pumping unit for pumping the fluid from the reservoir to said corresponding dispensing nozzles, said pumping unit of said at least one fluid supply circuit being activated only when said arm is moved over said tray.

This time T of the arm's movement only includes these three periods: acceleration/palliation/deceleration. However, it is possible that during the treatment of a same tray, this arm makes a round trip above this tray to ensure the treatment of the chicks contained in this one with two distinct fluids. In fact, this arm is then moved during two times T of movement.

According to an embodiment of this method for dispensing droplets of fluids, this arm bears a first set of dispensing nozzles and a second set of dispensing nozzles, said nozzles of each set being arranged to cover the entire dimension of the tray in a second direction perpendicular to the first direction droplets of at least one first fluid are dispensed simultaneously by means of said first set of dispensing nozzles and droplets of at least one second fluid, distinct from the first fluid, are dispensed simultaneously by means of said second set of dispensing nozzles of two distinct sprays or two distinct gels.

Alternatively, this arm bearing a first set of dispensing nozzles and a second set of dispensing nozzles, the nozzles of each set being arranged to cover the entire dimension of the tray in a second direction perpendicular to the first direction, the following steps are performed:
  a) firstly dispensing droplets of at least a first fluid by spraying through the first set of dispensing nozzles,
  b) then at least one second fluid, distinct from the at least one first fluid to be sprayed, is distributed by ejection of individual drops by means of the second set of distribution nozzles.

This method allows the administration of at least two different fluids to chicks contained on an open tray or basket in a very short time, while ensuring a homogeneous treatment of each chick.

The original design of this method requires a reduced space for its implementation and it is thus particularly well-adapted to implementation on small farms.

This mobile arm being advantageously adjustable in height, this method can be implemented with any type of open tray. The adjustment in width is carried out by the withdrawal, the blocking by stopper, or the non-use of certain nozzles and/or needles for application located on the periphery of the mobile arm.

Advantageously, such a method is particularly suitable for the administration of a spray (a first fluid) and a gel (a second fluid).

Preferably, steps a) and b) are performed with a single pass of the mobile arm over the tray, these nozzle assemblies being arranged on this arm so as to generate a time lag between steps a) and b).

Advantageously, the time offset between steps a) and b) is determined to guarantee the effective treatment of the poultry by said at least one second fluid.

It is thus ensured that each bird is directly exposed to the second fluid or consumes a sufficient quantity of this second fluid so that the mass treatment of the birds is homogeneous. In other words, the time interval between steps a) and b) of fluid distribution is calculated to avoid the possibility that the droplet mist obtained by distribution of the first fluid by means of the first set of distribution nozzles may reduce the adhesion, or wetting, of the droplets of the second fluid ejected by the second set of distribution nozzles, in particular when this latter fluid is a gel.

Alternatively, step a) is performed as said arm moves from a first edge to a second edge of said tray, said second edge being opposite said first edge, on a forward path extending along said first direction and step b) is performed as said arm moves from said second edge to said first edge on a return path along said first direction.

In yet another embodiment of this method for delivering fluid droplets onto an open tray, the first fluid is a liquid to be sprayed and the second fluid is a gel such as a soft gel, or a fluid having a viscosity between 50 and 200 cps at 20° C. Preferably, the viscosity of this fluid is between 50 and 180 cps at 20° C. and even more preferably between 54 and 177 cps at 20° C. Even more preferably, the viscosity is between 100 and 120 cps at 20° C. Purely as an illustration, the first fluid is an aqueous composition containing a vaccine.

This gel may include a coloring agent to visually control the uniform distribution of the drops on the open tray.

According to yet another embodiment of this method for delivering fluid droplets onto an open tray, in each of steps a) and b), a plurality of droplets having a uniform or substantially uniform size are formed.

This can be accomplished by controlling the fluid supply pressure at each nozzle of each assembly for a given nozzle type.

Preferably, in step a) a mist of droplets is formed, at least 80%, preferably at least 90%, of such droplets having a size between 145 microns and 230 microns.

Advantageously, in step b) a plurality of droplets is formed, at least 80%, preferably at least 90%, of these droplets having a size between 900 microns and 1500 microns.

According to yet another embodiment of this method for delivering droplets of fluids onto an open tray, the flow rate through said nozzles and the speed of movement of the moving arm are controlled to ensure a uniform or substantially uniform distribution of said droplets over the tray.

Preferably, the flow rate through each of said nozzles, delivering the first fluid, being between 6 ml/sec and 40 ml/sec, preferably between 8 ml/sec and 20 ml/sec, and the flow rate through each of said needles, delivering the second fluid, being between 15 ml/sec and 50 ml/sec, preferably between 15 ml/sec and 25 ml/sec. The pressure applied to deliver the first fluid is between 3 and 130 bar, and the pressure applied to deliver the second fluid is between 0.2 and 1 bar.

According to yet another embodiment of this method for delivering droplets of fluids onto an open tray, said fluids incorporate one or more active ingredients for vaccinating poultry species such as birds, or fluids other than vaccines such as nutritional compositions.

According to yet another embodiment of this method for delivering droplets of fluids onto an open tray, at least two distinct first fluids are dispensed by spraying and/or at least two distinct second fluids are dispensed by ejecting individual drops.

For illustrative purposes only, each set of dispensing nozzles may comprise two nozzle manifolds for dispensing two different products in a single pass.

The present process thus also covers the distribution of two or more distinct fluids to be sprayed, or atomized, and/or two or more fluids to be ejected in the form of individual drops. The latter fluids are preferably ejected through needles.

BRIEF DESCRIPTION OF THE DRAWINGS

Further advantages, purposes and particular embodiments of the present invention will be apparent from the following description, which is provided, for explanatory purposes and not in any way restrictive, with reference to the accompanying drawings, in which.

DESCRIPTION OF AN EMBODIMENT

The following drawings and description contain, for the most part, certain elements. They may therefore not only serve to better understand the present invention, but also contribute to its definition, if necessary.

First of all, we note that the figures are not to scale.

Figure 1:
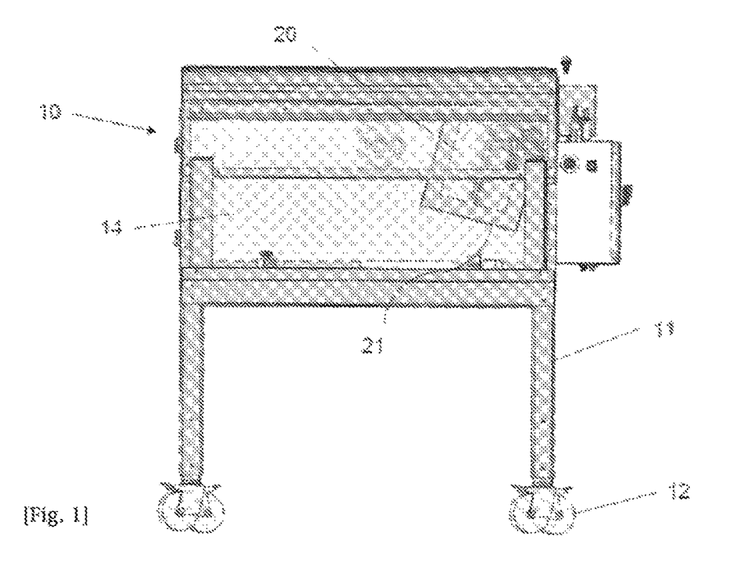
FIG. 1 is a front view of an apparatus for mass processing of chicks according to a particular embodiment of the present invention.
Figure 2:
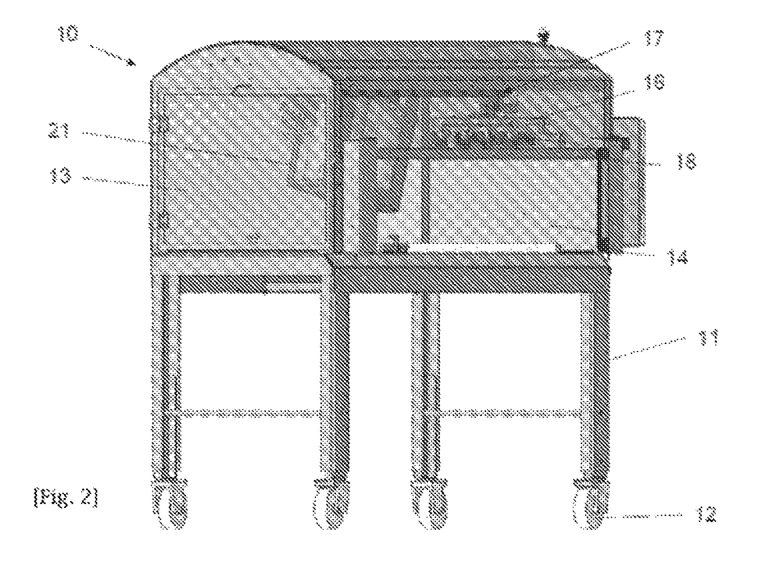
FIG. 2 is a perspective view of the apparatus in FIG. 1.
Figure 3:
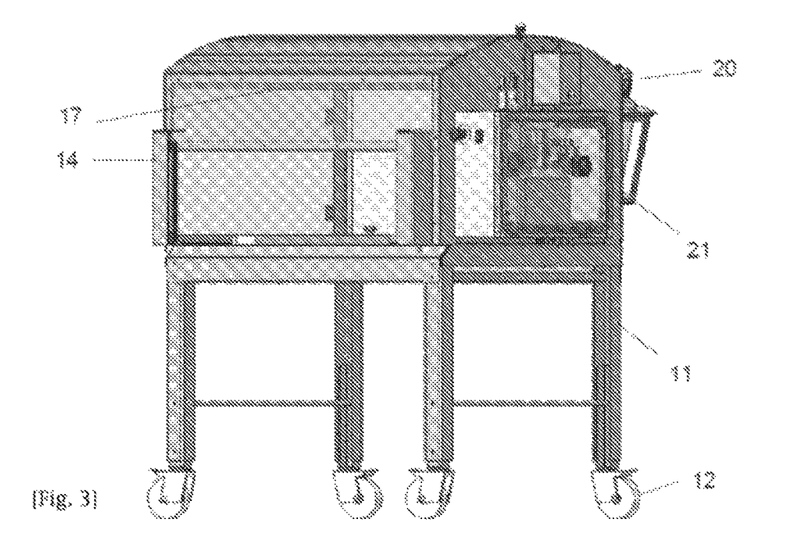
FIG. 3 is another perspective view of the apparatus of FIG. 1.
Figure 4:
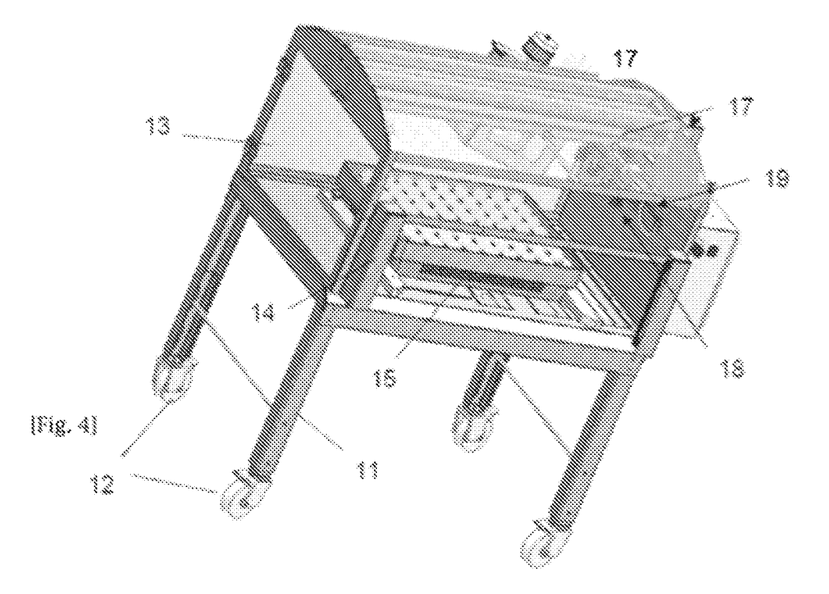
FIG. 4 is a perspective and top view of the apparatus of FIG. 1, with a basket containing chicks placed in its working area and awaiting processing.
Figure 5:
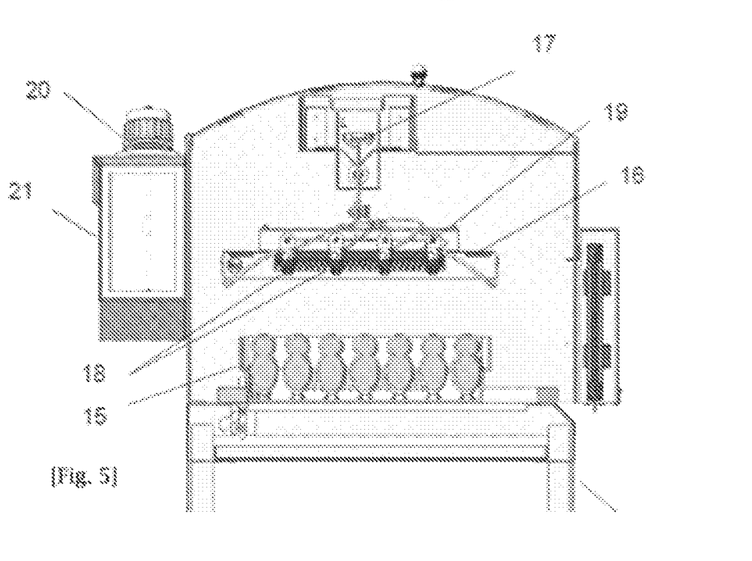
FIG. 5 is a cross-sectional view of the apparatus in FIG. 1, with a basket containing chicks placed in its working area and awaiting processing.
Figure 6:
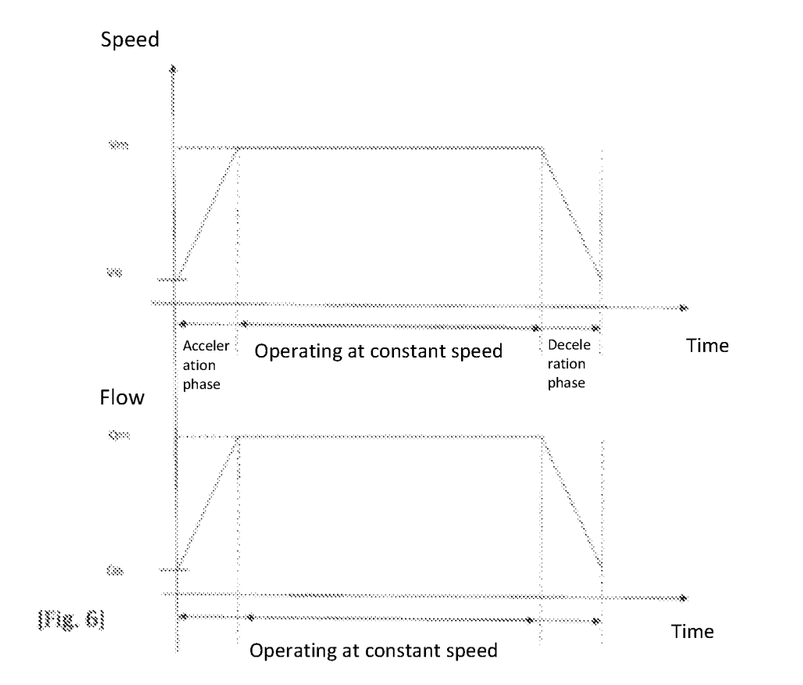
FIG. 6 illustrates the three phases of operation of the motor of the mobile arm drive unit, with acceleration, bearing and deceleration.

FIGS. 1 to 5 schematically illustrate a chick mass processing apparatus according to a particular embodiment of the present invention.

This apparatus comprises a building 10 provided with feet 11 having at their free end casters 12 to ensure the movement of the latter. The apparatus can have from 2 to 4 wheels 12. Each of these wheels 12 can have a locking device (not shown) to fix the apparatus in position.

This building 10 comprises in its upper part an enclosed space bordered by walls 13 which are at least partially transparent to visualize the interior of this space.

One of these walls 13 comprises a mobile flap 14 in vertical translation to allow access to this closed space, in particular for the introduction and removal of a basket 15 loaded with chicks, also for the cleaning and maintenance of the apparatus.

In addition to this physical barrier constituted by the mobile flap 14, and if it is desirable that the apparatus remain open, this apparatus can comprise one or more protection elements (not shown) to detect the presence of an object introduced into the treatment area such as the hand or arm of an operator. This or these protection elements are able to send detection signals to a central processing unit, which can stop an ongoing process or prevent the process from being started. As an example, this or these protection elements are infrared detectors.

Of course, it is still possible that the building 10 does not have such a movable flap 14 or such protection elements.

The interior of this enclosed space includes a work area for receiving and supporting an open basket 15 for processing, with the basket 15 in a stationary position.

A mobile arm 16, mounted on a longitudinal rail 17 defining a first direction, can translate along the rail 17 over the work area. The longitudinal rail 17 is attached to the upper end, or cover, of the building 10.

This mobile arm 16 is powered for movement by a drive unit comprising an electric motor including a gear wheel, said gear wheel meshing with a gear path of the longitudinal rail 17 extending along the first direction of the basket 15.

This mobile arm 16 bears a set of nozzles 18 and a set of deposit needles 19, these nozzles and these needles being arranged on the mobile arm 16 in such a way that the entire dimension of the basket 15 along a second direction perpendicular to the first direction defined by the longitudinal rail 17, is integrally covered by the set of nozzles 18 and by the set of deposit needles 19.

These nozzles and needles can be individually moved along the movable arm 16 to allow adjustment of the coverage of different baskets.

Of course, this device can include position sensors (not shown) to determine the precise positioning of the basket in the working area. It is then possible to automate the fluid dispensing sequences by automatic recognition of the type of basket 15 placed in the dispensing device.

One set of nozzles 18 comprises spray nozzles while the other set comprises dispensing needles 19, each of which comprises an orifice, each needle being configured to eject an individual drop of fluid through its orifice at a given fluid pressure.

While being advantageously compact, this apparatus makes it possible to deliver in a very short time interval, even quasi-simultaneously, two distinct fluids such as a spray and a gel to treat poultry in mass placed in an open basket.

This device comprises two reservoirs 20 which are placed in a support 21 at the height of the user, these reservoirs 20 being advantageously transparent to check the available level of fluid in each of them.

Each fluid supply circuit connecting a reservoir 20 to its corresponding nozzle and dispensing needle assembly includes a syringe pump 22 for drawing fluid from its corresponding reservoir into the supply circuit. Each syringe pump 22 comprises a piston activated by a pneumatic activator.

This apparatus includes a control unit (not shown) that allows each syringe pump 22 to be controlled and activated only when the arm moves over the basket 15.

This control unit is also configured to control the drive unit of the arm and to define a period of time T of movement of the mobile arm 16 over the working area comprising a period of progressive acceleration of said arm 16 out of the basket 15 and bringing said arm to a first end of said basket 15 along the first direction with a movement velocity V, a period of constant velocity V as said moving arm 16 moves over said basket 15, and a period of progressive deceleration of said arm 16 when said arm 16 has passed a second end of said basket 15 along said first direction.

Such an embodiment not only guarantees a uniform distribution of droplets over the open basket but also ensures that fluid consumption is limited to the volume of fluid needed to treat the chicks. It can be observed that the fluid losses that could result from irregular movement of the mobile arm 15 are eliminated The apparatus is therefore economical and space-saving The nozzle assembly 18 and the dispensing needle assembly 19 are also arranged on the mobile arm 16 to provide a time lag between the dispensing of the first fluid (vaporizable fluid) and the second fluid (gel).

This elongated mobile arm comprising two lateral edges that constitute a front and a rear face, considered in the direction of translational movement of this arm along the first direction, the nozzle assembly 18 is mounted on the front face of this mobile arm 16 while the deposit needle assembly 19 is mounted on the rear face of this mobile arm 16, thus being separated from the nozzle assembly 18 along the first direction.

This ensures that the distribution by spraying, or even by atomization, of the droplets of the first fluid by the first nozzle assembly 18 always precedes the distribution of the droplets of the second fluid by the deposit needle assembly 19.

Thus, there is no risk that the droplet mist created by spraying the first fluid may prevent the drops of the second fluid from adhering to the feathers of the chicks, which could lead to an inhomogeneous treatment of the latter.

According to an embodiment of the present apparatus, the minimum distance d spatially separating the nozzle assembly 18 from the dispensing needle assembly 19 along the first direction is between 5 and 9 cm. The speed of movement of the arm in its uniform range of movement is between 35 and 80 cm/second, preferably 55 cm/second.

What is claimed is:

1. An apparatus for delivering droplets of fluids onto an open tray (15) containing poultry, characterized in that it comprises:

- a stationary work surface for receiving and supporting said tray (15),
- a single arm (16) bearing a plurality of fluid dispensing nozzles, a drive unit for translating the single arm (16) along a first direction of the tray (15) when the tray is on said working surface, said arm (16) movable above said tray (15), the plurality of dispensing nozzles being connected to at least one fluid supply circuit, each fluid supply circuit comprising a fluid reservoir for supplying corresponding dispensing nozzles with a fluid, and a pumping unit for pumping the fluid from the reservoir to said corresponding dispensing nozzles, and a control unit configured to control the drive unit of the arm and to define at least one travel time of the arm (16) over said working surface, said travel time comprising:

a period of progressive acceleration of said arm (16) out of an area of said working surface occupied by said tray, such that said arm is brought to a first end of said tray (15) along the first direction with a moving velocity, a period of constant velocity as said arm (16) moves over said tray (15), and a period of progressive deceleration of said arm (16) when said arm has passed a second end of said tray (15) along said first direction, in that said control unit is also configured to control each pumping unit and activate each pumping unit only when said arm is over said tray.

2. The apparatus according to claim 1, characterized in that it comprises at least one sensor for detecting the area occupied by said tray on said working surface, said at least one sensor configured to send tray positioning signals to said control unit.

3. The apparatus according to claim 1, characterized in that each pumping unit is a syringe pump.

4. The apparatus according to claim 1, characterized in that said drive unit comprises an electric motor having a gear wheel, said gear wheel meshing with a gear track of a guide rail extending along the first direction of the tray (15).

5. The apparatus according to claim 1, characterized in that the drive unit is a linear activator, said mobile arm (16) being mounted perpendicularly to a free end of said activator.

6. The apparatus according to claim 1, characterized in that said arm (16) carries a first set of dispensing nozzles (18) for dispensing at least one first fluid and a second set of dispensing nozzles (19) for dispensing at least one second fluid, distinct from the at least one first fluid, the dispensing nozzles of each set being arranged so that an entire dimension of the tray (15) along a second direction perpendicular to the first direction is covered by the first and second sets of dispensing nozzles, when the tray (15) is received on said working surface.

7. The apparatus according to claim 6, characterized in that said first set of dispensing nozzles (18) comprises nozzles for spray dispensing of a fluid and said second set of dispensing nozzles (19) comprises nozzles for spray dispensing a fluid or needles for ejecting individual drops of a fluid.

8. The apparatus according to claim 6, characterized in that the apparatus is configured to provide a time lag between dispensing at least a first fluid through said first set of dispensing nozzles (18) and at least a second fluid through said second set of dispensing nozzles (19).

9. The apparatus according to claim 8, characterized in that said first and second sets of dispensing nozzles (18,19) are spaced apart from each other on said arm (16) along the first direction by a distance determining said time lag.

10. A method for delivering droplets of fluids onto an open tray (15) containing poultry, said tray (15) being stationary and placed on a stationary working surface, characterized in that:

a mobile arm (16) is moved over said stationary working surface, translating in a first direction of said tray (15), said arm (16) carrying a plurality of fluid dispensing nozzles, said plurality of fluid dispensing nozzles being arranged to cover an entire dimension of the tray (15) in a second direction perpendicular to the first direction, said mobile arm is moved for at least a travel time of the arm (16) over said working surface, said travel time comprising:

a period of progressive acceleration of said arm (16) out of an area of said working surface occupied by said tray, wherein said arm is brought to a first end of said tray (15) along the first direction with a moving velocity, a period of constant velocity as the arm (16) moves over said tray (15), and a period of progressive deceleration of said arm (16) when said arm has passed a second end of said tray (15) along said first direction, wherein the plurality of dispensing nozzles are connected to at least one fluid supply circuit, each fluid supply circuit comprising a fluid reservoir for supplying corresponding dispensing nozzles with a fluid and a pumping unit for pumping fluid from the reservoir to said corresponding dispensing nozzles, and wherein said pumping unit of said at least one fluid supply circuit is activated only when said arm is moved above said tray.

11. The method according to claim 10, characterized in that said plurality of fluid dispensing nozzles comprises a first set of dispensing nozzles (18) and a second set of dispensing nozzles (19), said dispensing nozzles of each set being arranged to cover an entire dimension of the tray (15) in a second direction perpendicular to the first direction, and wherein droplets of at least a first fluid are dispensed by said first set of dispensing nozzles, and droplets of at least a second fluid, distinct from the first fluid, are dispensed by said second set of dispensing nozzles.

12. The method according to claim 10, characterized in that said plurality of fluid dispensing nozzles comprises a first set of dispensing nozzles (18) and a second set of dispensing nozzles (19), said dispensing nozzles of each set being arranged to cover an entire dimension of the tray (15) in a second direction perpendicular to the first direction, and wherein the following steps are performed:

a) first, distributing droplets of at least a first fluid by spraying by the first set of dispensing nozzles (18), b) then, at least one second fluid, distinct from the at least one first fluid, is distributed by ejecting individual drops by the second set of dispensing nozzles (19).

13. The method according to claim 12, characterized in that step a) is performed as said arm moves from a first edge to a second edge of said tray (15), said second edge being opposite said first edge, on a forward path extending along said first direction and step b) is performed as said arm moves from said second edge to said first edge on a return path along said first direction.

14. The method according to claim 12, characterized in that steps a) and b) are performed in a single pass of the mobile arm (16) over said tray (15), said first and second sets of dispensing nozzles being arranged on said arm in such a way as to generate a time lag between steps a) and b).

15. The method according to claim 14, characterized in that the time lag between steps a) and b) is determined to guarantee an effective treatment of the poultry by said at least one second fluid.

\* \* \* \* \*